(12) United States Patent
Legrand et al.

(10) Patent No.: US 10,254,447 B2
(45) Date of Patent: Apr. 9, 2019

(54) SYSTEM AND METHOD FOR GENERATING MACHINE MARKING INSTRUCTIONS

(71) Applicant: ESSILOR INTERNATIONAL (COMPAGNIE GENERALE D'OPTIQUE), Charenton le Pont (FR)

(72) Inventors: Florence Legrand, Charenton le Pont (FR); Robert Pellegris, Charenton le Pont (FR); Vincent Roblot, Charenton le Pont (FR); Laurent Marcepoil, Charenton le Pont (FR); Sebastien Maurice, Charenton le Pont (FR); Frederic Dubois, Charenton le Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 706 days.

(21) Appl. No.: 14/364,401

(22) PCT Filed: Dec. 14, 2012

(86) PCT No.: PCT/EP2012/075580
§ 371 (c)(1),
(2) Date: Jun. 11, 2014

(87) PCT Pub. No.: WO2013/087855
PCT Pub. Date: Jun. 20, 2013

(65) Prior Publication Data
US 2014/0316554 A1    Oct. 23, 2014

(30) Foreign Application Priority Data

Dec. 15, 2011    (EP) .................................... 11306679

(51) Int. Cl.
*G02B 3/00* (2006.01)
*B29D 11/00* (2006.01)

(52) U.S. Cl.
CPC ...... *G02B 3/0025* (2013.01); *B29D 11/00317* (2013.01); *B29D 11/00951* (2013.01)

(58) Field of Classification Search
CPC ............ G02B 3/0025; B29D 11/00317; B29D 11/00951
See application file for complete search history.

(56) References Cited

U.S. PATENT DOCUMENTS

| 5,960,550 A * | 10/1999 | Weir ...................... G02C 7/021 |
| | | 33/200 |
| 6,024,448 A * | 2/2000 | Wu .................. B29D 11/00317 |
| | | 351/159.69 |

(Continued)

FOREIGN PATENT DOCUMENTS

| EP | 1 515 179 |   | 3/2005 |
| JP | 2006053227 A | * | 2/2006 |
| JP | 2007313633 A | * | 12/2007 |

OTHER PUBLICATIONS

International Search Report dated Apr. 5, 2013 in corresponding PCT application.

*Primary Examiner* — Kenneth M Lo
*Assistant Examiner* — Michael J Huntley
(74) *Attorney, Agent, or Firm* — Young & Thompson

(57) ABSTRACT

A system and method of generating machine marking instructions for marking an ophthalmic lens is disclosed. The method comprises the steps of receiving lens order data related to a lens order, receiving an initial marking layout and calculating, using the lens order data, ophthalmic lens data of an ophthalmic lens related to the lens order. The method also comprises the steps of determining, using the ophthalmic lens data, marking parameters relating to the ophthalmic lens, producing an additional marking layout by modifying the initial marking layout using the marking parameters and the lens order data, the additional marking (Continued)

layout representing the markings to be applied to the ophthalmic lens, and generating machine marking instructions arranged to cause a marking machine to mark the ophthalmic lens in accordance with the additional marking layout.

12 Claims, 6 Drawing Sheets

(56) References Cited

U.S. PATENT DOCUMENTS

| | | | | |
|---|---|---|---|---|
| 6,203,156 | B1* | 3/2001 | Wu | B29D 11/00317 |
| | | | | 351/159.69 |
| 7,874,671 | B2* | 1/2011 | Defranco | B41F 17/001 |
| | | | | 101/327 |
| 2001/0055111 | A1* | 12/2001 | Yoda | G01M 11/0207 |
| | | | | 356/127 |
| 2002/0003605 | A1* | 1/2002 | Rogers | G02C 7/021 |
| | | | | 351/159.69 |
| 2003/0111750 | A1 | 6/2003 | Morikawa et al. | |
| 2005/0073650 | A1* | 4/2005 | Ito | G02C 7/021 |
| | | | | 351/200 |
| 2006/0126016 | A1* | 6/2006 | Yokoyama | B29C 33/428 |
| | | | | 351/159.69 |
| 2007/0262061 | A1* | 11/2007 | Agmon | B41M 7/0027 |
| | | | | 219/121.6 |
| 2008/0051012 | A1* | 2/2008 | Akiyama | B24B 9/146 |
| | | | | 451/42 |
| 2008/0273073 | A1* | 11/2008 | Oakley | B41J 2/0057 |
| | | | | 347/103 |
| 2009/0059166 | A1* | 3/2009 | Suzuki | B23K 26/18 |
| | | | | 351/159.73 |

* cited by examiner

SYSTEM AND METHOD FOR GENERATING MACHINE MARKING INSTRUCTIONS

The present invention relates to the field of ophthalmic lens design and manufacturing, and more specifically to the field of marking ophthalmic lenses.

The design and manufacture of ophthalmic lenses typically comprises the steps of adding markings to the ophthalmic lenses. The markings allow for such things as rapid identification of the left and right lenses as well as the front and rear faces of a lens. The markings also serves to communicate information regarding the type of lens, the lens manufacturer, the lens wearer, as well as information relating to the physical features and optical functions of the lens.

The majority of lens marking is achieved using printing, engraving, or a combination of these. The process of printing on the surface of a lens can comprise a variety of known techniques, such as inkjet printing and/or UV polymerisation using UV cured inks. Similarly, the process of engraving into the surface or the interior of the lens can also comprise a variety of known techniques, such as laser engraving and/or mechanical engraving.

An example of such markings includes the markings related to the International Standards Organisation (ISO) requirements found in ISO10322 (relating to semi-finished spectacle lenses) and ISO8980 (relating to uncut finished spectacle lenses). One of the requirements of these standards is that all progressive lenses be permanently marked with an alphanumeric code identifying the lens type, the lens manufacturer and the focal properties of the lens. Other examples of markings include non-permanent markings for marketing purposes, or markings which aid in the identification of individual lenses during the manufacturing process of glasses or for communicating information for any other reason.

Thus, current marking schemes can include a number of technical markings (e.g. lens material, micro circles and addition values), as well as non-technical markings (e.g. product logo, manufacturer ID and branding information).

Known processes of marking ophthalmic lenses are labour-intensive, complex and prone to error. These difficulties are compounded by steady increases in the complexity of lens manufacturing processes. In particular, marking schemes can incorporate information from a variety of different manufacturing phases (e.g. collection of lens wearer data and prescription information, mass production of a mould, mass production of the lens, etc). Moreover, actual marking of the lens can be performed using a wide variety of different marking technologies (e.g. excimer laser, CO2 laser, micro-percussion, etc) and each individual marking may require its own level of visibility (e.g. low, medium or high). These different levels of visibility impact on the complexity associated with configuring the different marking technologies. Furthermore, more complex lens designs have required the marking of lenses on both convex and concave faces.

In order to address the problems associated with known marking processes, the present invention provides a system and method for generating machine marking instructions for marking ophthalmic lenses, the method comprises the steps of receiving lens order data related to a lens order; receiving an initial marking layout; calculating, using the lens order data, ophthalmic lens data of an ophthalmic lens related to the lens order; determining, using the physical design parameters, marking parameters relating to the ophthalmic lens; producing an additional marking layout by modifying the initial marking layout using the marking parameters and the lens order data, the additional marking layout representing the markings to be applied to the ophthalmic lens; and generating machine marking instructions arranged to cause a marking machine to mark the ophthalmic lens in accordance with the additional marking layout.

In one embodiment of the invention, the step of producing an additional marking layout further comprises the steps of producing a final marking layout, by modifying the initial marking layout using the marking parameters and the lens order data, the final marking layout representing the markings to be present on the ophthalmic lens; receiving a semi-finished marking layout representing the markings applied to a semi-finished lens; and producing the additional marking layout by subtracting the semi-finished marking layout from the final marking layout.

In one embodiment of the invention, the lens order data comprises a semi-finished marking layout code and the method further comprises the steps of extracting the semi-finished marking layout code from the lens order data; and using the semi-finished marking layout code to select a semi-finished marking layout from a semi-finished marking layout database.

In one embodiment of the invention, the lens order data comprises an initial marking layout code and the method further comprises the steps of extracting the initial marking layout code from the lens order data; and using the initial marking layout code to select an initial marking layout from the marking layout database using the initial marking layout code.

Preferably, a plurality of the marking parameters represent the positions of a plurality of markings relating to ophthalmic features of the specific lens; and the marking parameters representing the position of markings related to a first ophthalmic feature are associated with the marking parameters representing the position of markings related to a second ophthalmic feature such that a change in the position of the markings related to the first ophthalmic feature produces a change in the position of the markings relating to the second ophthalmic feature.

The present invention also provides a system for executing the steps of the above method, a networked data-processing means arranged to execute the steps of the above method and a computer program product for a data-processing device, the computer program product comprising a set of instructions which, when loaded into the data-processing device, causes the device to perform the steps of the above method.

As will be appreciated, the present invention provides several advantages over the prior art. For example, because the initial marking layout can be changed and manipulated at various times over the course of its existence, it will be possible to make changes to the marking layout in order to reflect the new information received at a variety of different manufacturing phases. Also, because the present invention is able to provide marking instructions to a specific machine, the use of a wide variety of different marking technologies is made easier and the complexity of the resulting markings can be increased. Furthermore, the present invention reduces the difficulties associated with marking lenses on both convex and concave faces.

Further advantages of the present invention will become apparent upon reading the detailed description set out below, in conjunction with the accompanying drawings, in which.

In the following detailed description of the embodiments of the present invention, the term "ophthalmic lens" is used to describe any type of lens related to the eye and includes, but is not limited to, spectacle lenses, contact lenses and intraocular lenses. The expression "ophthalmic lens data" is used to describe parameters associated with at least one of the physical features of a lens and/or the optical function of a lens; ophthalmic lens data can include, but are not limited to the shape of the lens, the focal point, or points, of a lens and known lens design reference points such as the Fitting Cross (FC) and the Geometric Centre (GC). The expression "marking parameters" is used to describe the parameters relating to the markings on a lens and include, but are not limited to, the size and location of lens design reference points such as those mentioned above, the size, shape and location of logos and marketing objects, the name of a lens wearer, along with information relating to the font, location and colour used to print the name of the lean wearer. Finally, the expression "lens order data" is used to describe information relating to a lens order, which information can include, amongst other information, the name of the lens wearer, the lens wearer's prescription, the type of lens and the name of an eye care professional associated with the lens wearer.

Figure 1:
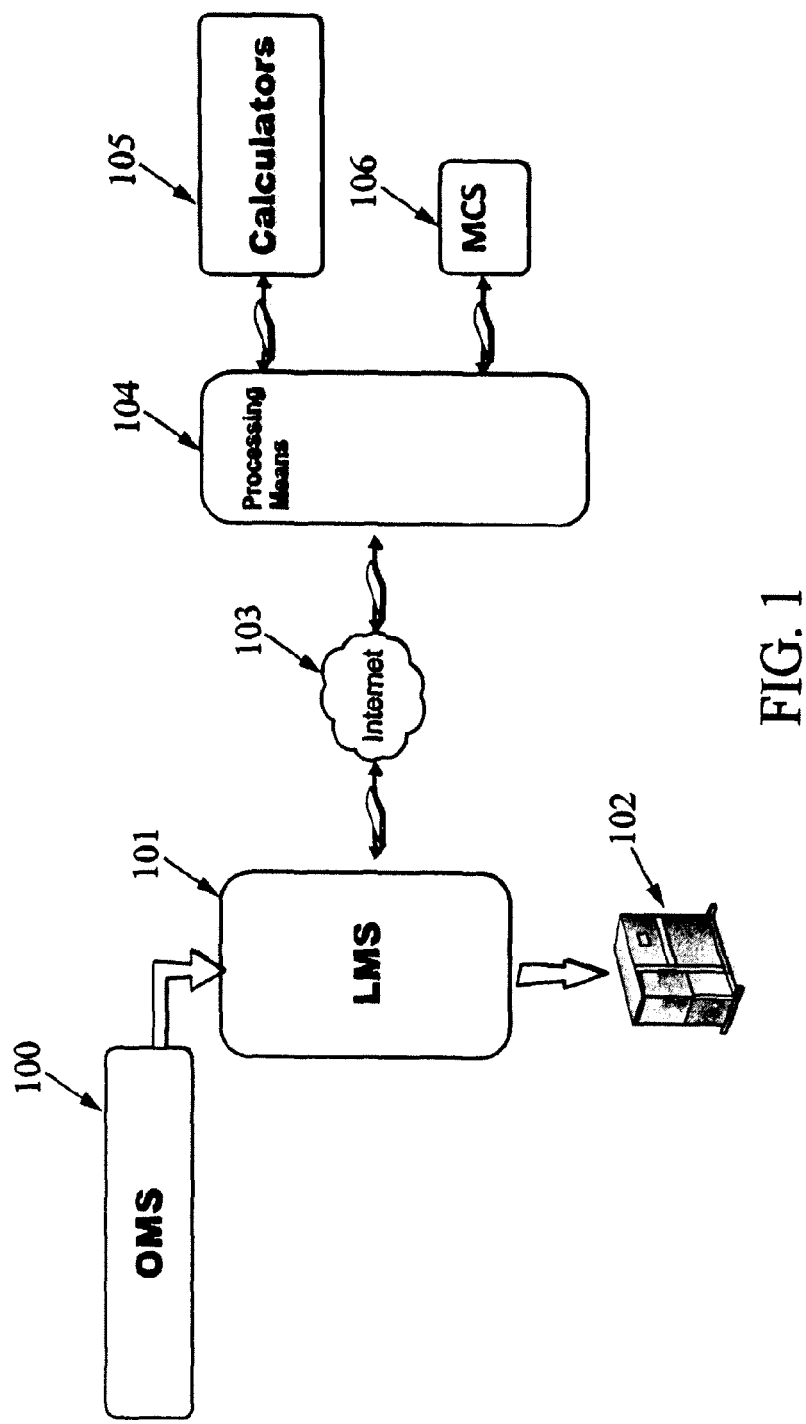
FIG. 1 is a functional block diagram of a system which can be used in accordance with one embodiment of the present invention.

FIG. 1 is a functional block diagram of a system which can be used in accordance with the present invention. In particular, the system comprises an Ordering Management System (OMS) 100 which receives orders for the creation of lenses, each order having lens order data associated therewith. In some embodiments of the invention, the OMS 100 can form part of a centralised computer system which collects order information from eye care professionals, such as opticians and ophthalmologists. In these embodiments, eye care professionals can logon to a centralised OMS 100 and upload information relating to a specific lens order. In alternate embodiments, the OMS 100 can be situated on the premises of the eye care professional. In these alternate embodiments an eye care professional can input information directly into the OMS 100. As will be appreciated, other OMS 100 arrangements are possible, such as having OMS server software implemented in a network server, and having OMS client software installed in the computer systems of individual eye care professionals. In the above embodiments, the OMS uses the input to produce lens order data relating to a lens order for a wearer. The information input into the OMS can be collected automatically by any number of ophthalmic measurement devices and/or input manually by an eye care professional.

The OMS 100 of FIG. 1 is connected via a data communication network to a Laboratory Management System (LMS) 101, which manages information transfer relating to the creation of lenses. Known Laboratory Management Systems can manage the implementation of the various manufacturing steps of the lens, or can manage a part of these. The LMS 101 can also perform the calculations required to generate ophthalmic lens data or, alternatively, can send calculation requests to Lens Calculators (LCs) 105, as described below. In the present embodiment, the LMS 101 is also arranged to provide instructions to the at least one marking machine 102.

The OMS 100 and LMS 101 can be connected via the Internet. Preferably, communication between the OMS 100 and LMS 101 is encrypted in order to secure the lens order data. The LMS 101 is also connected via a data communication network to at least one marking machine 102 for marking lenses. The marking machines 102 can include a number of known devices for marking lenses using mechanical, laser, or other, means. The LMS 102 is also connected to processing means 104.

The processing means 104 is arranged to provide a computing interface between the LMS 101 and the LCs 105 and Marking Calculation System (MCS) 106, described below. The main function of the processing means 104 is to act as a software interface between the LMS 101 and other functional parts of the system, such as the LCs 105 and the MCS 106. In the present embodiment, the processing means 104 is arranged to convert a number of file formats into a common, proprietary file format. This conversion facilitates data exchange between all functional modules of the system.

The processing means 104 is connected to a Marking Calculation System (MCS) 106 and a number of Lens Calculators (LCs) 105 arranged to calculate ophthalmic lens data based, in part, on the lens order data generated by the OMS 100. The processing means 104 is also connected to a Marking Calculation System (MCS) 106, which is arranged to generate machine instructions to be used by the marking machine 102 to execute marking of a lens. As will be appreciated, the above elements will typically be located in different geographical locations and can be interconnected using secured or unsecured data-communication networks, or indeed a combination thereof.

Figure 2:
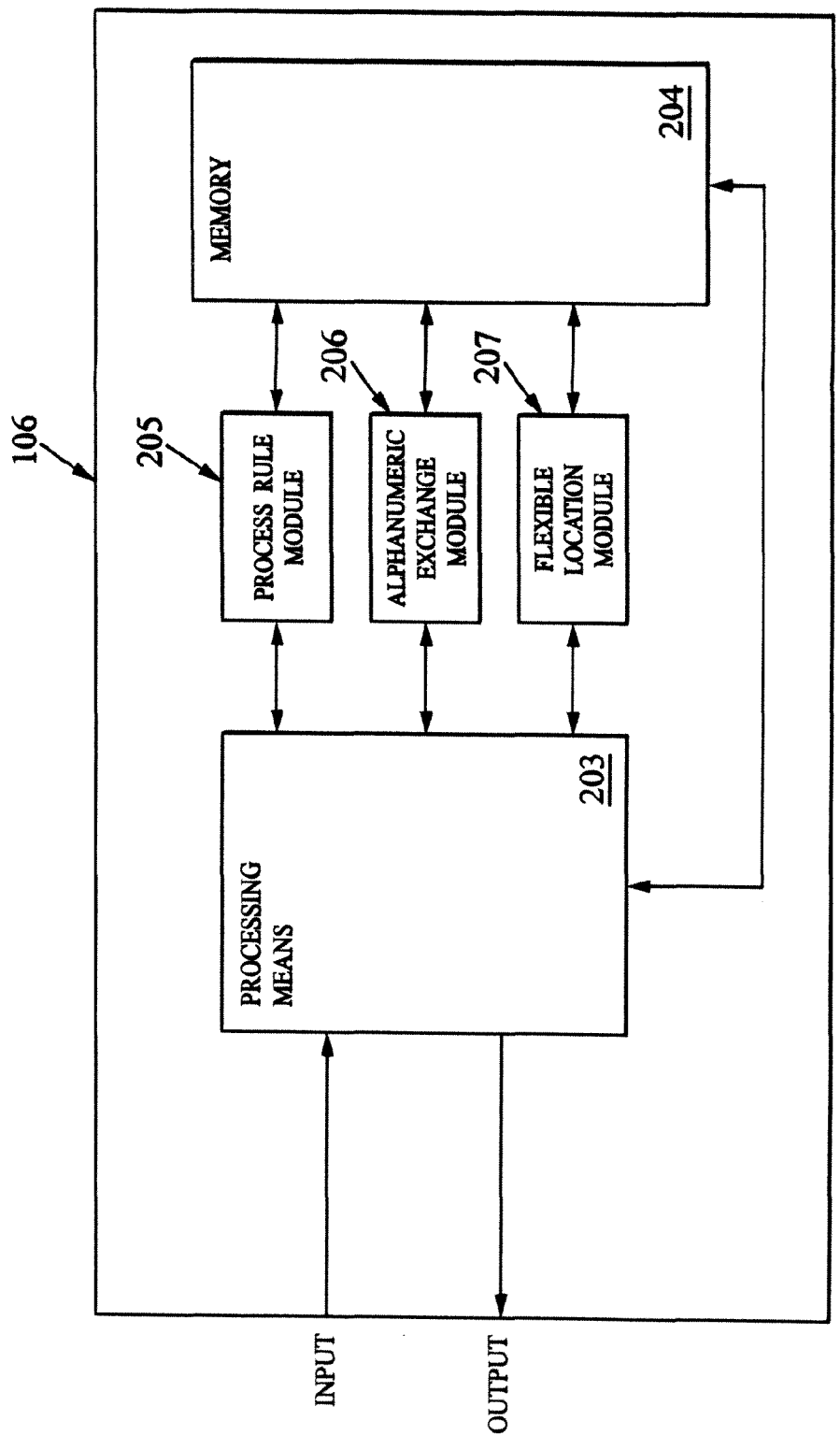
FIG. 2 is a functional block diagram of a system in accordance with one embodiment of the present invention.

With reference to FIG. 2, the structure of the MCS 106 is described below. The MCS 106 comprises an input 200 and an output 201. The MCS 106 also comprises a processing module 203 for processing the received information. The processing module has access to a memory 204. The MCS 106 also comprises a process rule module 205, an alphanumeric exchange module 206 and a flexible location module 207, each of which has access to the memory 204 and can be accessed by the processing module 203.

With reference to FIGS. 1 and 2, the operation of the system of the present invention is described below. When a new lens order is generated by an eye care professional, the lens order data will typically comprise lens wearer data (e.g. name and prescription of the lens wearer), lens frame data (e.g. type and size of frame requested by the lens wearer) and lens data (e.g. type of lens, lens manufacturer name, lens model number, etc). The lens order data will advantageously be written, by the OMS, into a file (e.g. Extensible Markup Language, or XML) of the type that is easily readable by a wide variety of applications. Once created, the lens order data is sent to the LMS 101 for lens production.

Figure 3:
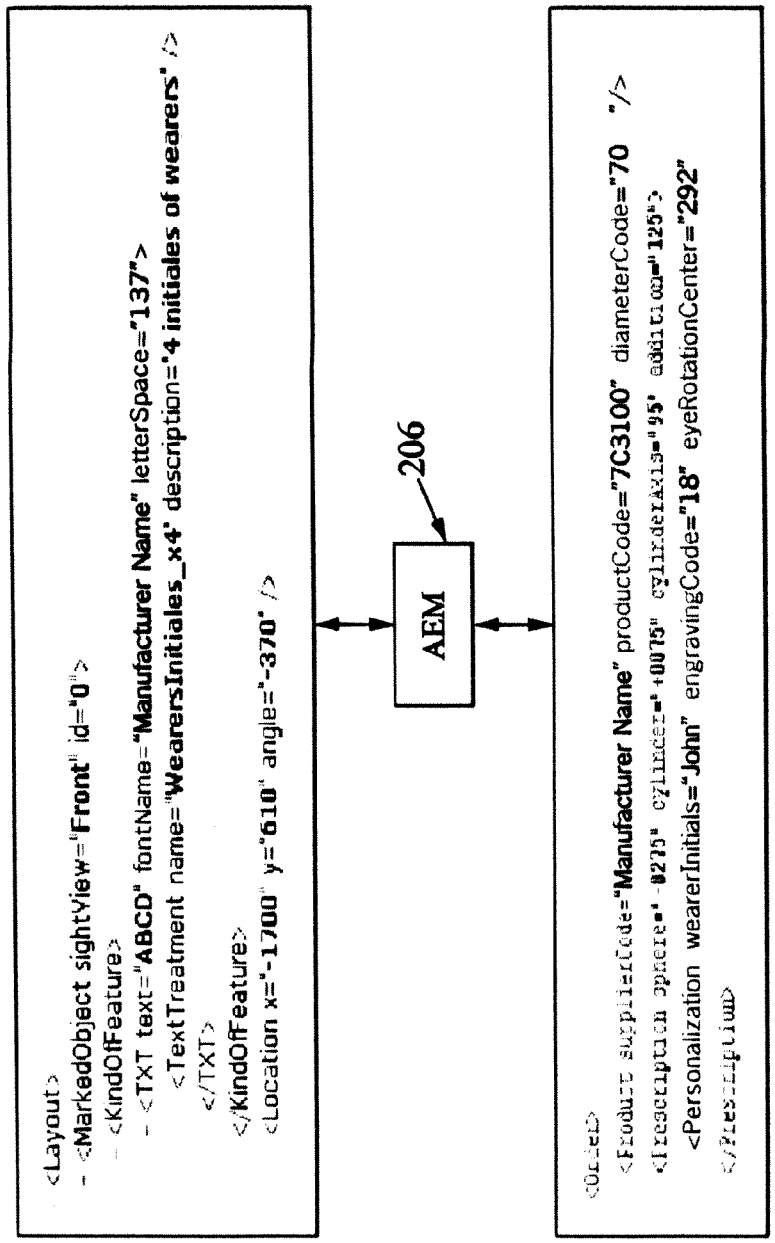
FIG. 3 is a functional diagram representing the execution of a text replacement function in accordance with an embodiment of the present invention.
Figure 4:
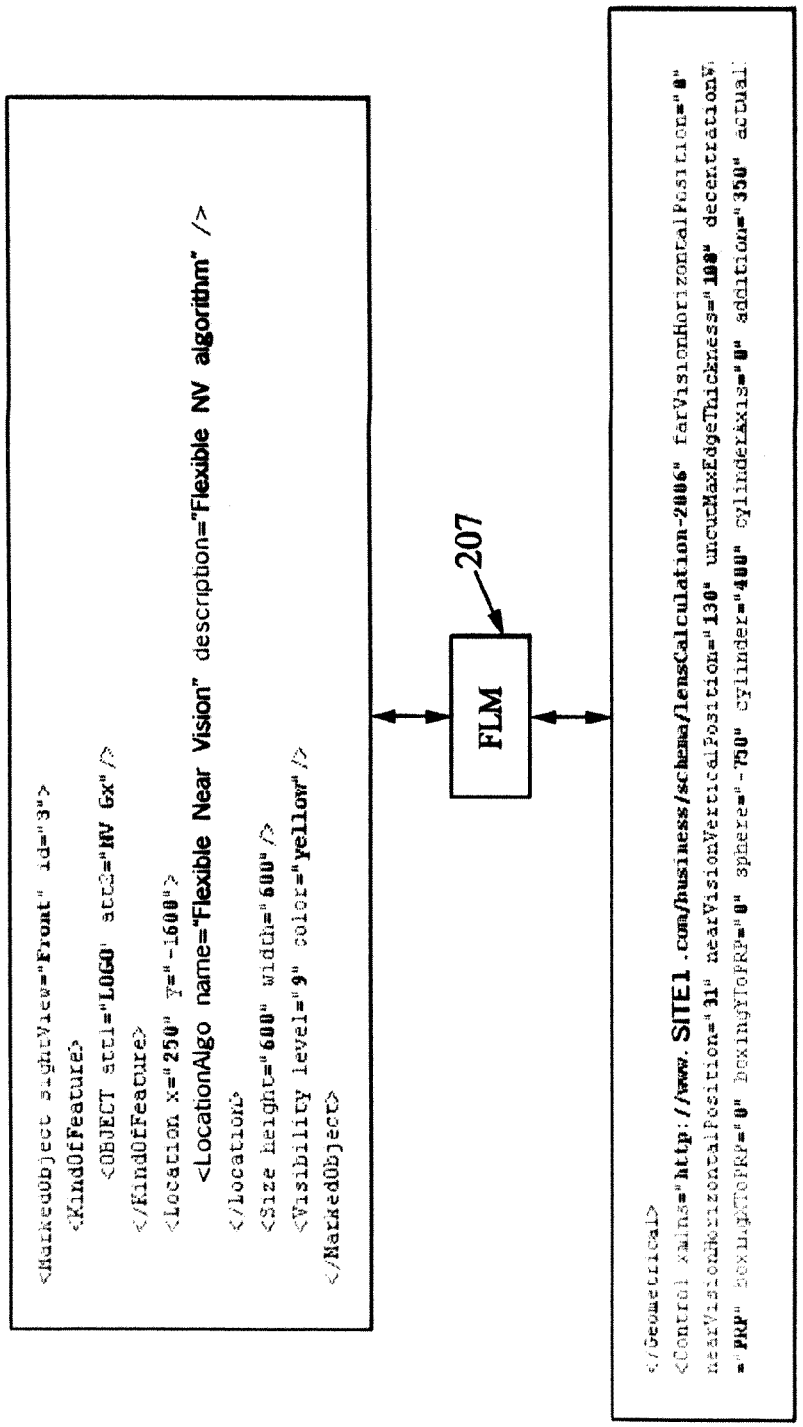
FIG. 4 is a functional diagram representing the execution of a position linking and transposing function in accordance with one embodiment of the present invention.

Along with the lens order data file, an initial marking layout file will also be received by the LMS 101. The marking layout file is a standardised file format containing information relating to various markings (i.e. the marking layout), which have been made, or need to be made, to a given lens. In one embodiment of the invention, the initial marking layout can be embedded in the lens order data prepared by the OMS 100. In another embodiment, the lens order data can comprise a kitting code, which kitting code can be used to access an initial marking layout database (not shown) and retrieve an initial marking layout. The kitting code is included in, and associated with, lens order data. As shown in the embodiment of FIGS. 3 and 4, the initial marking layout can be embodied in an XML file. The arrangements shown in FIGS. 3 and 4 contain information arranged in a proprietary manner. The skilled reader will however appreciate that other arrangements are possible. Moreover, other file formats (e.g. text file) are also possible within the scope of the present invention.

Once the lens order data and the initial marking layout are received by the LMS 101, they are sent, via a data-communication network and/or the Internet 103, to processing means 104. The processing means 104 is arranged to extract information from various file types received from any of the LMS 101, the MCS 106 and the LCs 105, and generate new file types containing that same information. Accordingly, the processing means 104 is mainly tasked with ensuring interoperability between the LMS 101, the MCS 106 and the LCs 105, each of which can be located in a different geographical location, and may use different file types, languages and units.

Using the lens order data received from the processing means 104, the LCs 105 are configured to calculate ophthalmic lens data associated with at least one of the physical features of a lens and/or the optical function of a lens. As mentioned above, the ophthalmic lens data can include, but are not limited to, the shape of the lens design, the focal point, or points, of a lens and known lens design reference features such as the Fitting Cross (FC) and the Geometric Centre (GC). Once computed, the ophthalmic lens data are sent by the LCs 105 to the processing means 104. The processing means 104 then prepares the ophthalmic lens data and the lens order data for sending to the MCS 106.

Preferably, both the ophthalmic lens data and the lens order data are sent to the MCS 106. The MCS 106 uses the information found in the ophthalmic lens data and the lens order data to produce an additional marking layout, which comprises the marking parameters representing markings to be made to a lens.

Once input into the MCS 106, the processing module 203 stores at least a part of the initial marking layout and the lens order data in memory 204 in order to allow data manipulation. The processing module 203 is also arranged to make requests to any of three associated modules, namely the Process Rule Module (PRM) 205, the Alphanumeric Exchange Module (AEM) 206 and the Flexible Location Module (FLM) 207. Each of the associated modules also has access to the memory 204 in order to facilitate data manipulation.

With reference to FIGS. 2 and 3, the operation of the Alphanumeric Exchange Module (AEM) 206 is described below. The processing module 203 makes a request to the AEM 206 when alphanumeric information, such as strings of letters and/or numbers, is to be extracted from the lens order data file or from the ophthalmic lens data and used to replace placeholder information in the initial marking layout, as shown in FIG. 3.

Upon receiving the request, the AEM 206 analyses the contents of the initial marking layout in order to identify objects which contain text information that is to be replaced. Although this can be achieved in a number of ways, in a preferred embodiment of the invention, this is done by analysing the initial marking layout file for an object which relates to a string of text.

Once a replaceable (or updatable) object is found, the AEM 206 determines if an algorithm exists for replacing the placeholder value. If such an algorithm does exist, the algorithm is run in order to replace the placeholder value and the process is repeated for the next object for which a placeholder value has been assigned.

In the example of FIG. 3, the AEM 206 first finds, in the initial marking layout file, the text object which has a description variable equal to "4 initiales of wearers". This description provides an indication that the objects relate to four digits of the wearer's initials. In this example, the "4 initiales of wearers" object comprises the variable TXT text, which has been assigned a placeholder value of "ABCD". The object also comprises the fontName variable, which is assigned a value of "Manufacturer Name", indicating that the initials of the wearer are to be written in a particular font (i.e. a font specific to the manufacturer) and a letterSpace variable which indicates the correct spacing to be applied between the letters. The text object also comprises a Text-Treatment name variable, which provides an indication to the AEM 206 of what algorithm to run for the replacement of the value of TXT text variable. In this example, the algorithm to run is "WearersInitiales_x4".

In a preferred embodiment of the invention, the algorithms associated with marking layout objects are stored in memory 204. In the present example, the AEM 206 finds the "WearersInitiales_x4" in memory and the algorithm provides instructions for replacing the placeholder value of "ABCD" with the value assigned to the wearerInitials variable found in the lens order data file, as shown in FIG. 3. The value taken form the wearerInitials variable (i.e. "John") in the lens order data file is then used to replace the placeholder information of the TXT text variable of the initial marking layout file. Thus, the value of "ABCD" is replaced by "John".

With reference to FIGS. 2 and 4, the operation of the Flexible Location Module (FLM) 207 is described below. The processing module 203 makes a request to the FLM 207 when positional information is to be extracted from the lens order data file or from the ophthalmic lens data and used to replace placeholder information in the initial marking layout, as shown in FIG. 4. As will be appreciated, other, more complex, algorithms can also be achieved by the present invention.

Upon receiving the request, the FLM 207 analyses the contents of the initial marking layout in order to identify objects which contain positional information which is to be replaced or altered. In a preferred embodiment of the invention, this is done by analysing the initial marking layout file for objects which contain positional information.

Once such an object is found, the FLM 207 determines if an algorithm exists for updating the positional information. If such an algorithm does exist, the algorithm is run in order to replace the placeholder values and the process is repeated for the next object for which a placeholder variable has been assigned.

In the example of FIG. 4, the FLM 207 first finds, in the initial marking layout file, the position object shown in the marking layout file. The positional object found is attached to two other objects. Thus, att1="LOGO" indicates that the positional information related to this object should be used for the object LOGO, and att2="NV Gx" indicates that the positional information related to this object should be used for the near vision marking. The placeholder information for the position of this object is x="250" and y="−1600". The algorithm used to affect change on these placeholder variables is found in the "LocationAlgo name" variable. Accordingly, FLM 207 will use the value "Flexible Near Vision" to search for an appropriate algorithm, to replace the placeholder variables with variables taken from the lens order data and/or the ophthalmic lens data.

In the example of FIG. 4, the "Flexible Near Vision" algorithm comprises instructions to replace the placeholder coordinates 250 and −1600 with information found in the ophthalmic lens data, and namely the position of the nearVisionHorizontalPosition field and the nearVisionVerticalPosition field. After execution of the Flexible Near Vision algorithm, the line <Location x="250" y="−1600"> found in the initial marking layout will thereby be replaced by the line <Location x="31" y="130">. Moreover, because object LOGO and NV Gx are both attached to this positional object, the position of both objects will be changed in order to create the additional marking layout. Objects LOGO and NV Gx will therefore be linked.

Figure 5:
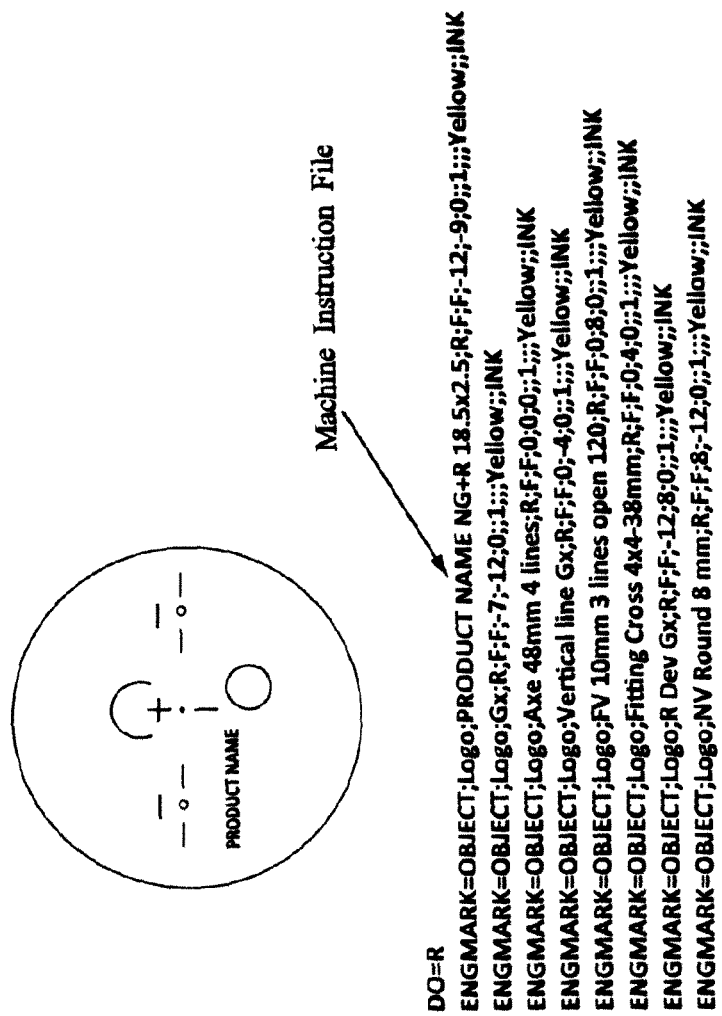
FIG. 5 is a representation of a series of machine marking instructions produced in accordance with an embodiment of the present invention.

With reference to FIGS. 2 and 5, the operation of the Process Rule Module (PRM) 205 is described below.

A request to the PRM 205 is made when the additional marking layout is considered to be completed. The PRM 205 receives the additional marking layout and produces machine marking instructions. The machine marking instructions can comprise the type of machine used for each marking (or a group of markings). The machine marking instructions are then sent to the processing means 104 for conversion of the machine marking instructions into suitable instructions to be executed on marking machine 102.

In a preferred embodiment, the machine marking instruction format used in the present invention is in accordance with the formats defined in the Data Communication Standard (DCS) set out by the Vision Council, as shown on FIG. 5. The skilled reader will appreciate however that other instruction formats could also be used.

Once produced, the machine marking instructions are sent to the marking machine 102. The machine marking instructions are then executed by the marking machine in order to create the markings represented by the machine marking parameters.

Figure 6:
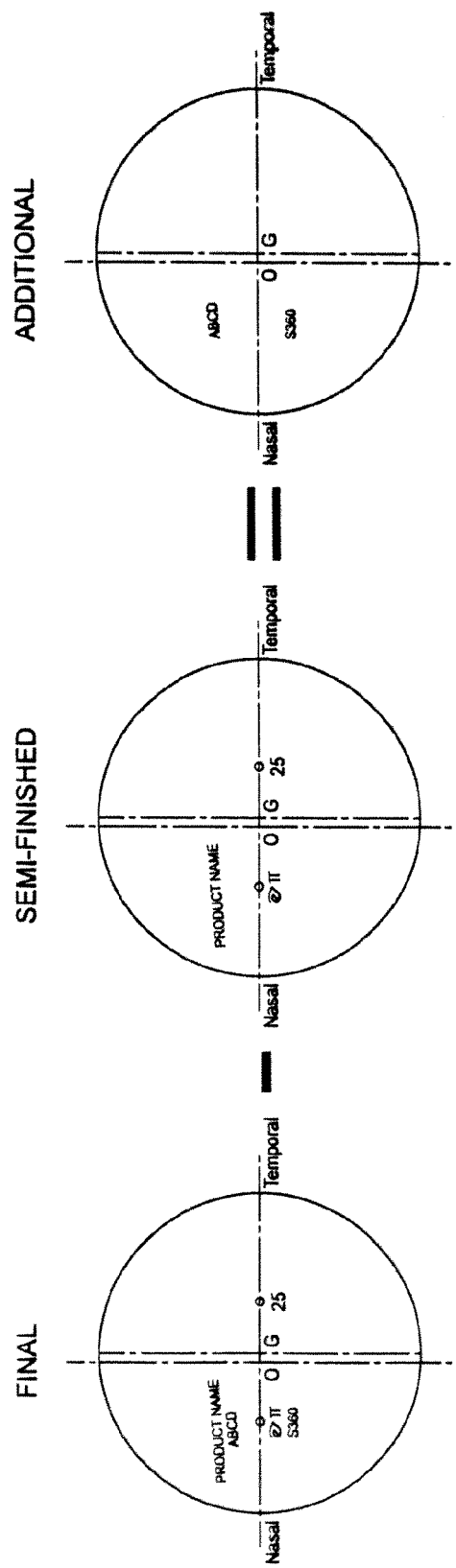
FIG. 6 is a graphical representation of the information contained in an additional marking layout, a final marking layout and a semi-finished marking layout.

In the above described embodiments, the MCS 106 modifies the initial marking layout using the ophthalmic lens data and the lens order data. In a further embodiment of the present invention, the MCS 106 also uses a semi-finished marking layout, as represented in FIG. 6, together with the initial marking layout, the lens order data and the ophthalmic lens data. Similarly to the initial marking layout, the semi-finished marking layout can also be embedded within the lens order information, or can be selected from a semi-finished marking database. The representations shown on FIG. 6 are actual layout representations, that is to say, they are a visual representation of the markings that would be present on the lens. The first representation (i.e. on the left of FIG. 6) shows what markings should be present on the final marking layout. The representation in the middle of FIG. 6 shows a representation of the marking layout relating to a semi-finished lens.

As described above, the MCS 106 is arranged to calculate the value of the various objects relating to a marking layout comprising marking parameters representing markings which are to be made to a lens.

In the further embodiment of the present invention however, this marking layout is known as the final marking layout. Moreover, in the further embodiment, MCS 106 is also arranged to receive a marking layout relating to a semi-finished lens. The marking layout of the semi-finished lens typically comprises marking parameters that are already present on a semi-finished lens. These already present markings will therefore not be required to be reproduced by the marking machines 102.

Upon receipt of the marking layout relating to the semi-finished lens, the MCS 106 is arranged to identify the objects found in the semi-finished marking layout and match these objects with the equivalent objects in the final marking layout, as produced above. Once equivalent objects are identified in the final marking layout, these equivalent objects are removed from the final marking layout to produce the additional marking layout, as shown in FIG. 6. Thus, in this further embodiment of the invention, the additional marking layout comprises marking parameters which are to be made to the lens by the marking machine, and does not comprise marking parameters relating to markings which are already present on the semi-finished lens.

The skilled person will realize that steps of various above-described methods can be performed by programmed computers. Accordingly the above-mentioned embodiments should be understood to cover storage devices containing machine-executable or computer-executable instructions to perform some or all of the steps of the above-described methods. The embodiments are also intended to cover computers programmed to perform the steps of the above-described methods.

The functionality of the elements shown in the Figures can be provided using either dedicated hardware and/or software. The expressions "processing", "processing means" and "processing module" can include, but is not limited to, any of digital signal processor (DSPs) hardware, network processors, application specific integrated circuits (ASICs), field programmable gate arrays (FPGAs), read only memories (ROMs) for storing software, random access memories (RAMs), and non volatile storage.

The invention claimed is:

1. A method of generating machine marking instructions for marking an ophthalmic lens, the method comprising the steps of:
    receiving lens order data related to a lens order;
    receiving an initial marking layout;
    calculating, using the lens order data, ophthalmic lens data of an ophthalmic lens related to the lens order;
    determining, using the calculated ophthalmic lens data, marking parameters relating to the ophthalmic lens;
    producing an additional marking layout by modifying the initial marking layout using the marking parameters determined using calculated ophthalmic lens data, said additional marking layout providing information related to the calculated ophthalmic lens data, and the lens order data, the additional marking layout representing the markings to be applied to the ophthalmic lens;
    generating machine marking instructions arranged to cause a marking machine to mark the ophthalmic lens in accordance with the additional marking layout; and
    marking the ophthalmic lens according to the machine marking instructions generated in accordance with the additional marking layout.

2. The method of claim 1, wherein the step of producing an additional marking layout further comprises the steps of:
    producing a final marking layout, by modifying the initial marking layout using the marking parameters and the lens order data, the final marking layout representing the markings to be present on the ophthalmic lens;
    receiving a semi-finished marking layout representing the markings applied to a semi-finished lens; and producing the additional marking layout by subtracting the semi-finished marking layout from the final marking layout.

3. The method of claim 2, wherein the lens order data comprises a semi-finished marking layout code and the method further comprises:
   extracting the semi-finished marking layout code from the lens order data; and
   using the semi-finished marking layout code to select a semi-finished marking layout from a semi-finished marking layout database.

4. The method of claim 1, wherein the lens order data comprises an initial marking layout code and the method further comprises:
   extracting the initial marking layout code from the lens order data; and
   using the initial marking layout code to select an initial marking layout from the marking layout database using the initial marking layout code.

5. The method of claim 1, wherein:
   a plurality of the marking parameters represent the positions of a plurality of markings relating to ophthalmic features of the specific lens; and
   the marking parameters representing the position of markings related to a first ophthalmic feature are associated with the marking parameters representing the position of markings related to a second ophthalmic feature such that a change in the position of the markings related to the first ophthalmic feature produces a change in the position of the markings relating to the second ophthalmic feature.

6. A system for generating machine marking instructions for marking an ophthalmic lens, the system comprising processors arranged to:
   receive lens order data related to a lens order;
   receive an initial marking layout;
   calculate, using the lens order data, ophthalmic lens data of an ophthalmic lens related to the lens order;
   determine, using the calculated ophthalmic lens data, marking parameters relating to the ophthalmic lens;
   produce an additional marking layout by modifying the initial marking layout using the marking parameters determined using calculated ophthalmic lens data, said additional marking layout providing information related to the calculated ophthalmic lens data, and the lens order data, the additional marking layout representing the markings to be applied to the ophthalmic lens;
   generate machine marking instructions arranged to cause a marking machine to mark the ophthalmic lens in accordance with the additional marking layout; and
   marking the ophthalmic lens according to the machine marking instructions generated in accordance with the additional marking layout.

7. The system of claim 6, wherein the processors is further arranged to:
   produce a final marking layout, by modifying the initial marking layout using the marking parameters and the lens order data, the final marking layout representing the markings to be present on the ophthalmic lens;
   receive a semi-finished marking layout representing the markings applied to a semi-finished lens; and
   produce the additional marking layout by subtracting the semi-finished marking layout from the final marking layout.

8. The system of claim 7, wherein the lens order data comprises a semi-finished marking layout code and the processors are further arranged to:
   extract the semi-finished marking layout code from the lens order data; and
   use the semi-finished marking layout code to select a semi-finished marking layout from a semi-finished marking layout database.

9. The system of claim 6, wherein the lens order data comprises an initial marking layout code and the processors is further arranged to:
   extract the initial marking layout code from the lens order data; and
   use the initial marking layout code to select an initial marking layout from the marking layout database using the initial marking layout code.

10. The system of claim 6, wherein:
    a plurality of the marking parameters represent the positions of a plurality of markings relating to ophthalmic features of the specific lens; and
    the marking parameters representing the position of markings related to a first ophthalmic feature are associated with the marking parameters representing the position of markings related to a second ophthalmic feature such that a change in the position of the markings related to the first ophthalmic feature produces a change in the position of the markings relating to the second ophthalmic feature.

11. A networked data processors for generating machine marking instructions for marking a surface of an ophthalmic lens, the networked data processor are arranged to:
    receive lens order data over a data communications network, the lens order data being related to a lens order;
    receive an initial marking layout over a data communication network;
    calculate, using the lens order data, ophthalmic lens data of an ophthalmic lens related to the lens order;
    determine, using the calculated ophthalmic lens data, marking parameters relating to the ophthalmic lens;
    produce an additional marking layout by modifying the initial marking layout using the marking parameters determined using calculated ophthalmic lens data, said additional marking layout providing information related to the calculated ophthalmic lens data, and the lens order data, the additional marking layout representing the markings to be applied to the ophthalmic lens;
    generate machine marking instructions arranged to cause a marking machine to mark the ophthalmic lens in accordance with the additional marking layout, and
    marking the ophthalmic lens according to the machine marking instructions generated in accordance with the additional marking layout.

12. The networked data processors of claim 11, wherein the lens order data comprises an initial marking layout code and the networked processors are further arranged to:
    extract the initial marking layout code from the lens order data; and
    use the initial marking layout code to select an initial marking layout from the marking layout database using the initial marking layout code.

* * * * *